May 10, 1949.  H. RÄZ-AMMANN  2,469,666
ANTISKID CHAIN
Filed Dec. 7, 1945
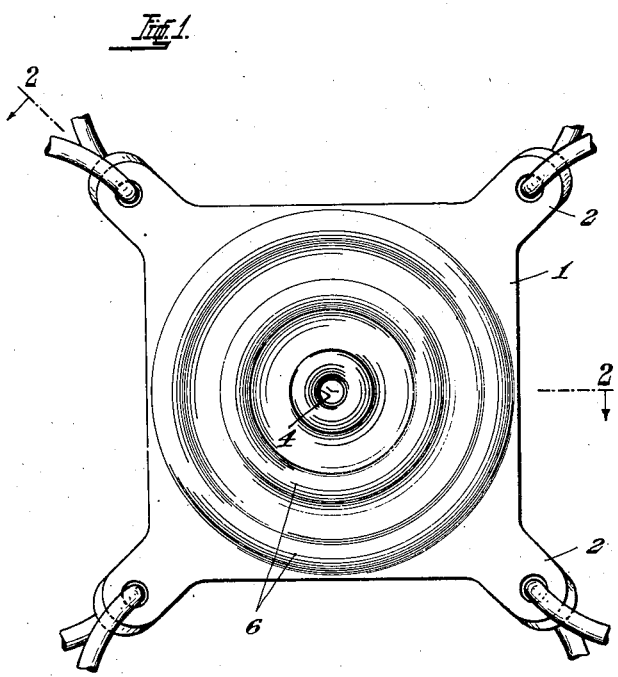
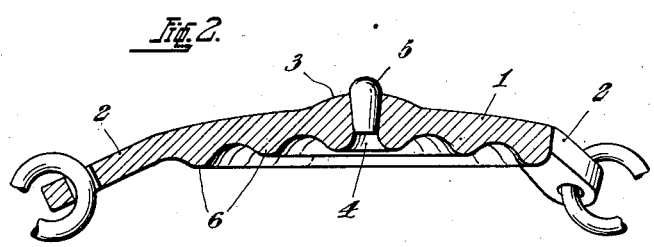
INVENTOR
HERMANN RÄZ-AMMANN
BY Patented May 10, 1949

2,469,666

UNITED STATES PATENT OFFICE 2,469,666

ANTISKID CHAIN

Hermann Räz-Ammann, Thun, Switzerland; Ida Räz-Ammann, sole heiress of said Hermann Räz-Ammann, deceased Application December 7, 1945, Serial No. 633,385
In Switzerland January 25, 1945

8 Claims. (Cl. 152—229)

1

The present invention relates to improvements in anti-skid chains for car wheels. It is an object of the invention to provide an anti-skid chain with intermediary chain plates, each of which has at least one anti-skid body inserted therein and projecting beyond the tread surface of the chain plate, whereby said anti-skid body serves efficiently to prevent the car wheel from slipping on ice or other slippery surfaces.

Another object of the invention is to provide in anti-skid chains intermediary chain plates which have at least one elevated bulged portion on the outer or tread surface carrying a conical anti-skid pin of hard metal which projects with its hemispherical end beyond the bulged portion of the chain plate.

Still a further object of the invention is to provide means for maintaining chain plates in position on rubber tires (outer covers) by suction.

These and other features of the invention will appear from the following detailed description of one specific embodiment thereof illustrated in the accompanying drawing, in which Fig. 1 is a bottom plan view of a chain plate and Fig. 2 is a transverse sectional view taken on line 2—2 of Fig. 1.

The chain plate 1 illustrated is substantially square shaped and terminates at each corner in a perforated lug or loop 2 to which are secured the end links of known cross bracing chains of tire grips for car wheels (not shown). The plate 1 is slightly cambered or curved in outward direction and has in the middle of its outer surface which forms the tread surface, an elevated bulged or outwardly enlarged portion 3 (Fig. 2). In the center of the elevated portion 3 which at the same time is the center of the plate 1 is provided a bore 4 wherein a slightly conical pin 5 is inserted, so as to be supported on its whole conical circumference surface by the wall defining the bore 4 and to project with the hemispherical or rounded end beyond the bulged surface of the chain plate 1. Thus, a substantially uninterrupted arcuate tread surface is obtained, which is gradually reinforced toward the center, at which pin 5 slightly extends beyond said elevated portion 3 forming the transition between said pin and the remainder of said arcuate tread surface. The conical pin 5 consists of hard metal, preferably cemented hard metal carbide, as for instance, cemented tungsten carbide having a degree of hardness of at least Mohs 9 equal to Rockwell (84) A degrees. The length of pin 5 corresponds substantially to the thickness of the

2 enlarged portion 3 at its opening or bore 4. The inner side of the plate 1 which will be in contact with the running surface of the tire (outer cover), is provided with a number of spaced circular ribs 6 which are arranged concentrically around the central bore 4 and are wavy or rounded so as to prevent damage of the tire surface.

When the plate is positioned under the wheel of the car it will be pressed by the load upon the ground, whereby the pin 5 will bite into the ground while ribs 6 on the reverse of the plate 1 will be engaged with the running or tread surface of the tire and prevented from slipping or shifting thereon. Owing to the wave-like ribbed surface, the plate 1 attaches itself to the running surface of the tire so well by suction, that, according to tests performed, the plate is not lifted from the tire surface by the centrifugal force during travel, nor will it be displaced thereon.

It will be understood that the plate 1 may have another suitable contour and other securing means for the cross bracing chains or strips. There may be inserted more than one pin of hard metal or otherwise shaped anti-skid body in each plate. Instead of several circular ribs on the bearing side of the plate, even a single rib has proved to be sufficient for creating the suction effect.

Having thus described the invention, what is claimed as new and desired to be secured by Letters Patent is:

1. In an anti-skid chain device, an intermediary chain plate having an outer tread surface of substantially square shape, said plate being outwardly curved and being provided at the center of its outer surface with an elevated bulged portion, and an anti-skid pin made of hard metal and inserted in said elevated portion and providing with the latter a relatively uninterrupted tread surface, said pin terminating in an arcuate end projecting beyond said elevated bulged central surface portion.

2. An anti-skid chain comprising intermediary chain plates linked therein, each plate carrying at least one anti-skid body inserted in an elevated portion on the tread surface of said plate and projecting beyond the surface of said portion, said anti-skid body consisting of hard metal, and at least one circular rib formed on the bearing side of said plate opposite to said tread surface, said rib being wave-like rounded, so as to prevent damage of the tire surface.

3. In an anti-skid device, a plate member having an outer tread surface, which is outwardly curved and gradually reinforced from the outer ends of said plate member toward the center of the latter, a hard metal body connected to said plate member at the center thereof, and a curved enlargement forming part of said plate member adjacent the center thereof and surrounding said body, said body being provided with a head projecting beyond said enlargement and being shaped to form a transition with respect to the outer surface of said enlargement.

4. In an anti-skid device according to claim 3, wherein the contours of said enlargement and of said head of said body are spherically shaped.

5. In an anti-skid device according to claim 3, wherein said plate member has a bottom surface, which is provided with concentrical ribs defining at least one circular groove, said plate member being adapted to bear with its bottom surface on the surface of the rubber tire of a wheel and to engage said tire for producing suction between said groove of said plate member and said rubber tire surface.

6. In an anti-skid device according to claim 3, wherein said hard metal body is conically shaped and set in an opening centrally disposed in said enlargement.

7. In an anti-skid device according to claim 3, wherein the bottom of said plate member is provided with at least one circular rib disposed concentrically with respect to said hard metal body.

8. In an anti-skid device according to claim 3, wherein said hard metal body is made of a cemented tungsten carbide and in the form of a conical pin with rounded head.

HERMANN RÄZ-AMMANN.

REFERENCES CITED

The following references are of record in the file of this patent:

UNITED STATES PATENTS

| Number | Name | Date |
|---|---|---|
| 1,243,022 | Wengraf | Oct. 16, 1917 |
| 1,370,758 | Myers | Mar. 8, 1921 |
| 1,403,982 | Smith | Jan. 17, 1922 |